(12) United States Patent
Xu et al.

(10) Patent No.: US 9,319,969 B2
(45) Date of Patent: Apr. 19, 2016

(54) METHOD AND APPARATUS FOR ACCESSING WIRELESS SENSOR NETWORK

(71) Applicant: Huawei Technologies Co., Ltd., Shenzhen, Guangdong (CN)

(72) Inventors: Yong Xu, Shenzhen (CN); Yongjun Liu, Shenzhen (CN); Mu Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 13/664,203

(22) Filed: Oct. 30, 2012

(65) Prior Publication Data

US 2013/0058298 A1 Mar. 7, 2013

Related U.S. Application Data

(63) Continuation of application No. PCT/CN2011/073589, filed on May 3, 2011.

(30) Foreign Application Priority Data

Apr. 30, 2010 (CN) .......................... 2010 1 0165632

(51) Int. Cl.
*H04W 84/18* (2009.01)
*H04W 48/16* (2009.01)

(52) U.S. Cl.
CPC .............. *H04W 48/16* (2013.01); *H04W 84/18* (2013.01)

(58) Field of Classification Search
None
See application file for complete search history.

(56) References Cited

U.S. PATENT DOCUMENTS

| 8,005,108 | B1* | 8/2011 | Broad et al. .................. 370/432 |
| 8,014,804 | B2* | 9/2011 | Banerjea ........................ 455/513 |
| 8,351,451 | B2* | 1/2013 | Patil et al. ...................... 370/429 |
| 8,447,252 | B2* | 5/2013 | Bagge et al. ............... 455/161.1 |
| 2004/0125777 | A1 | 7/2004 | Doyle et al. |
| 2004/0264413 | A1 | 12/2004 | Kaidar et al. |
| 2004/0264426 | A1 | 12/2004 | Komatsuzaki et al. |
| 2006/0009216 | A1* | 1/2006 | Welnick et al. ............... 455/434 |

(Continued)

FOREIGN PATENT DOCUMENTS

| CN | 1574779 A | 2/2005 |
| CN | 1981547 A | 6/2007 |

(Continued)

OTHER PUBLICATIONS

Search Report in corresponding Chinese Patent Application No. 201010165632.5 (Apr. 27, 2013).

(Continued)

*Primary Examiner* — Robert C Scheibel
(74) *Attorney, Agent, or Firm* — Leydig, Voit & Mayer, Ltd.

(57) ABSTRACT

A method and apparatus for accessing a wireless sensor network are provided in embodiments of this invention. The technical solution provided in embodiments of this invention includes: when receiving a first beacon frame, stopping channel scan temporarily, and establishing a new channel scan sequence according to operating channels of a current wireless sensor network recorded in the beacon frame. Non-operating channels are not included in the new channel scan sequence. Time for performing subsequence channel scan is reduced, so that the process of accessing the current wireless sensor network of a device node expecting for network can be accelerated.

14 Claims, 3 Drawing Sheets

(56) References Cited

U.S. PATENT DOCUMENTS

| | | | |
|---|---|---|---|
| 2006/0030318 A1* | 2/2006 | Moore et al. | 455/434 |
| 2007/0258508 A1 | 11/2007 | Werb et al. | |
| 2011/0032913 A1* | 2/2011 | Patil et al. | 370/338 |

FOREIGN PATENT DOCUMENTS

| | | |
|---|---|---|
| CN | 101267578 A | 9/2008 |
| CN | 100473212 C | 3/2009 |
| CN | 101483894 A | 9/2009 |
| EP | 1995923 A1 | 9/1999 |
| EP | 1492276 A2 | 6/2004 |
| WO | WO 2005/010214 A2 | 2/2005 |
| WO | WO 2007040398 A1 | 4/2007 |

OTHER PUBLICATIONS

Written Opinion of the International Searching Authority in corresponding PCT Patent Application No. PCT/CN20111073589 (Jul. 28, 2011).

Ahn et al., "IEEE P802.15 Working Group for Wireless Personal Area Networks (WPANs)," May 2009, IEEE, New York, New York.

International Search Report in corresponding PCT Patent Application No. PCT/CN2011/073589 (Jul. 28, 2011).

Extended European Search Report in corresponding European Patent Application No. 11774426.8 (Apr. 2, 2013).

* cited by examiner

METHOD AND APPARATUS FOR ACCESSING WIRELESS SENSOR NETWORK

CROSS-REFERENCE TO RELATED APPLICATIONS

This application is a continuation of International Patent Application No. PCT/CN2011/073589, filed on May 3, 2011, which claims priority to Chinese Patent Application No. 201010165632.5, filed on Apr. 30, 2010, both of which are hereby incorporated by reference in their entireties.

TECHNICAL FIELD

The present invention relates to the field of wireless sensor technology, and more specifically, to a method and apparatus for accessing a wireless sensor network.

DESCRIPTION OF THE RELATED ART

Wireless sensor networks are widely applied wireless networks suitable for various practical environments. Wireless sensor networks have found their extensive applications in military, medical care and health, environmental protection, public traffic and other fields due to their advantageous features, such as, ad hoc, autonomous, self energy saving, high reliability, low cost, etc.

There are two kinds of wireless sensor networks described in existing sensor network standards: non-beacon enabled networks and beacon enabled networks. In a beacon enabled network, a beacon-capable device sends out beacons periodically, through sending beacons, not only time synchronization with surrounding nodes, but also network information provision to peripheral nodes expecting for accessing the network can be realized. For example, in a superframe-employed network, a coordinator sends beacons to surrounding nodes, for each superframe period, it begins at the timing when a beacon is sent out, within the beacon, the duration of the superframe period, time slot scheduling of the superframe, and time synchronization for various devices and other information can be contained. In a non-beacon enabled network, there is no periodic beacon transmission, and beacons are only transmitted by a specific device as demand, for example, in network access process or when time synchronization is necessary. Communications between the apparatus in a non-beacon enabled network are generally asynchronous, that is, a transmitting device sends a communication request when communication is needed to perform inter-device synchronization coordination and then data transmission.

Devices in a wireless sensor network usually adopt one channel to communicate, however, in order to increase network communication capacity and avoid mutual interference between devices, network devices can use multiple channels to communicate simultaneously. In the multi-channel communication mode, various devices can communicate with each other on their different optimal channels constantly, or can communicate in a frequency hopping manner, particularly, including random sequence frequency hopping and constant sequence frequency hopping. Frequency hopping communication needs precise time synchronization between devices, while there is not a high time synchronization requirement in the case of constant optimal channel communication of devices.

In existing multi-channel communication networks, various device nodes generally operate in different channels, and switch to channels of receiving devices only when communication is needed. When a device expecting for network joins in a network, instead of staying on a channel to complete the access process, it enquires on each potential communication channel according to its own parameters, that is, to explore on each possible communication channel to see whether there is an accessible wireless network. In doing so, the node expecting for network may broadcast a beacon request frame on a channel and wait for a corresponding period of time to receive a beacon frame. After sending the beacon request frame, the device expecting for network only accepts beacon frames sent from networks, and does not accept data information transmitted on the channel. If a beacon frame is received, the device node expecting for network determines whether to join in a network according to content carried on the beacon frame. When it is determined to access a wireless network present on the current channel, the device node expecting for network sends association information to a device node sending the beacon frame for subsequent network access process; if the network present on the current channel is unsuitable for access, the device node discards the received beacon frame. If no beacon frame is received in a defined period of time, the device node expecting for network skips to another channel to repeat the above steps, until each channel set therein has been detected.

In the prior art, although the multi-channel communication method can increase communication resources and avoid communication collision, a device expecting for network has to send beacon request frames on various possible channels, and has to wait for a certain period of time on channels on which beacon request frames have been sent to acquire network beacon information required to complete the network access process, consuming a large amount of time and energy.

SUMMARY OF THE INVENTION

In view of above, a method and apparatus for accessing a wireless sensor network is provided in an embodiment of this invention, capable of achieving fast, effective access to a wireless sensor network.

In order to achieve the above purpose, the following technique solutions are provided in embodiments of this invention.

A method for accessing a wireless sensor network, comprising:

performing channel scan from a first channel by a device node expecting for network according to a predefined channel scan sequence;

pausing the channel scan when receiving a first beacon frame returned from a beacon sending node during the channel scan, wherein the beacon frame carries with operating channels of beacon sending nodes in a current wireless sensor network and a first channel link quality parameter of a channel on which a current beacon sending node is located;

comparing the operating channels of beacon sending nodes in the current wireless sensor network with the predefined channel scan sequence to delete channels except the operating channels from the predefined channel scan sequence to construct a new channel scan sequence;

continuing the channel scan for operating channels that have not been scanned according to the new channel scan sequence;

determining a parent node for accessing the wireless sensor network according to first channel link quality parameters in received beacon frames of the operating channels;

selecting an operating channel for the device node expecting for network to access the wireless sensor network on the operating channel through the parent node.

An apparatus for accessing a wireless sensor network, comprising:

a channel scan unit for performing channel scan from a first channel according to a predefined channel scan sequence;

a scan control unit for pausing the channel scan when receiving a first beacon frame returned from a beacon sending node during the channel scan, wherein the beacon frame carries with operating channels of beacon sending nodes in a current wireless sensor network and a first channel link quality parameter of a channel on which a current beacon sending node is located;

a construction unit for comparing the operating channels of beacon sending nodes in the current wireless sensor network with the predefined channel scan sequence to delete channels except the operating channels from the predefined channel scan sequence, and construct a new channel scan sequence;

wherein, the scan control unit is further used to continue the channel scan for channels that have not been scanned according to the new channel scan sequence;

a determination unit for determining a parent node for accessing the wireless sensor network according to first channel link quality parameters in received beacon frames of the operating channels;

an access unit for selecting an operating channel for the device node expecting for network to access the wireless sensor network on the operating channel through the parent node.

A method for accessing a wireless sensor network, comprising:

selecting a beacon sending node of a current wireless sensor network as a parent node, and determining a second channel scan sequence constructed according to operating channels in the current wireless sensor network;

performing a second-round channel scan while synchronously switching channels for a device node expecting for network and the parent node according to the second channel scan sequence;

determining an operating channel for the device node expecting for network according to second channel link quality parameters carried on beacon frames received during the second-round channel scan, and accessing the wireless sensor network on the operating channel through the parent node.

An apparatus for accessing a wireless sensor network, comprising:

a preprocess unit for selecting a beacon sending node of a current wireless sensor network as a parent node, and determining a second channel scan sequence constructed according to operating channels in the current wireless sensor network;

a second-round scan unit for synchronously switching channels for a device node expecting for network and the parent node according to the second channel scan sequence to perform a second-round channel scan;

an access unit for determining an operating channel for the device node expecting for network according to second channel link quality parameters carried on beacon frames received during the second-round channel scan, and accessing the wireless sensor network on the operating channel through the parent node.

It can be seen that a method and apparatus for accessing a wireless sensor network is provided in embodiments of this invention. According to technique solutions provided in embodiments of this invention, when a first beacon frame is received, the channel scan is paused, a predefined channel scan sequence is adjusted according to operating channels of a current wireless sensor network recorded in the beacon frame, the non-operational channels are deleted from the channels, so that channel scan time can be saved, and the process of accessing to the current wireless sensor network by a device node expecting for network can be accelerated.

BRIEF DESCRIPTION OF THE DRAWINGS

For a more explicit description of the technical solutions of embodiments of this invention, a brief introduction of accompanying drawings to be used in the description of these embodiments will be given below. Obviously, accompanying drawings described below are merely some embodiments of this invention, for those skilled in the art, other accompanying drawings can be derived from these ones without any creative efforts.

DETAILED DESCRIPTION OF THE PREFERRED EMBODIMENT

For a better understanding of technical solutions of this invention for those skilled in the art, a clear and complete description of technical solutions of embodiments of this invention will be given in connection with accompanying drawings of embodiments of this invention. Obviously, embodiments described herein are merely some embodiments of this invention, but not all of them. Based on those embodiments of this invention, other embodiments can occur to those skilled in the art without any creative efforts, all of which fall within the scope of this invention.

Figure 1:
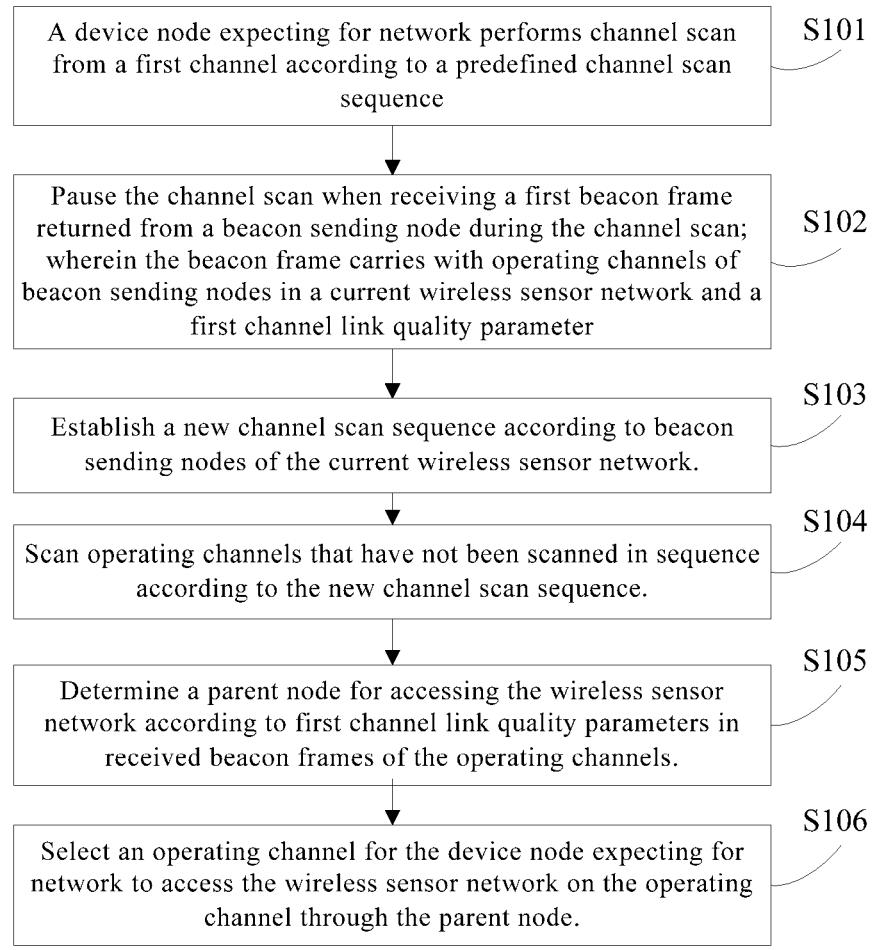
FIG. 1 is a flowchart of a method provided in an embodiment of this invention.

Referring to FIG. 1, a network access method provided in an embodiment of this invention comprises the following steps.

S101. A device node expecting for network performs channel scan from a first channel according to a predefined channel scan sequence;

S102. Pause the channel scan when receiving a first beacon frame returned from a beacon sending node during the channel scan; wherein the beacon frame carries with operating channels of beacon sending nodes in a current wireless sensor network and a first channel link quality parameter;

The first channel can be any channel of the predefined channel scan sequence.

In the method provided in the embodiment of this invention, before joining in a network by a device node expecting for network, a range of operating channels is generally predefined according to its own system for scanning, not exceeding beyond the number of operable channels in a range of its operating frequencies, such as 16 channels available for selection in the range of 2.4 GHz. Once a range of scan channels has been determined, for example, 13 channels can be selected from the 16 available channels as scan channels and scanned by a certain order. For example, channels 1-13 can be selected, and the channel scan sequence can be defined as from channel 1 to channel 13. After the determination of channels to be scanned and their channel scan order, a channel scan sequence can be formed for the channels to be scanned according to the channel scan order. Then, recorded channels are scanned in turn according to the channel scan sequence.

The channel scan process comprises: sending a beacon request frame on a scan channel by the device node expecting for network, and then waiting a predetermined period of time.

For the convenient of description, assume that a channel X is now being scanned by the device node expecting for network according to the current predefined channel scan sequence. The device node expecting for network sends a beacon request frame on channel X. In practical applications, the device node expecting for network may add its predefined channel scan sequence in the beacon request frame with a frame format particularly shown in Table 1. As shown in Table 1, four bytes in the third column are used to record a predefined channel scan sequence.

TABLE 1

| Byte: 1    | 1               | 4                    |
|------------|-----------------|----------------------|
| Frame head | Command frame   | Channels to be       |
|            | identifier      | scanned              |

The device node expecting for network waits a predetermined period of time on channel X. If there is a beacon sending node capable of sending a beacon frame on channel X, the beacon sending node sends a beacon frame to the device node expecting for network after receiving the beacon request frame transmitted from the device node expecting for network. In general, upon receiving a beacon frame on a channel, the device node expecting for network will switch to a next channel in the predefined channel scan sequence to continue its channel scan process; if there is not a beacon sending node on channel X, no beacon frame can be sent after the device node expecting for network has sent a beacon request frame, in this case, after waiting a time exceeding a predetermined time threshold on channel X, the device node expecting for network switches to a next channel in the predefined channel scan sequence to continue its channel scan process.

In the embodiment of this invention, the device node expecting for network performs channel scan from a first channel of a predefined channel scan sequence, until a first beacon frame is received. When a first beacon frame is received by the device node expecting for network, instead of switching to a next channel in the predefined channel scan sequence to continue channel scan as that in existing channel scan process, the channel scan is paused. If no beacon frame returned on the scanned channel is received by the device node expecting for network, channel scan is performed continuously according to the predefined channel scan sequence, until each channel of the predefined channel scan sequence has been scanned.

The beacon frame sent from the beacon sending node generally comprises a current network ID, time synchronization, and other information. Because the beacon sending node operates in the current multi-channel wireless sensor network, operating channels of its surrounding beacon sending nodes might have been recorded in its communications with those surrounding beacon sending nodes; or operating channels of various surrounding beacon sending nodes might have been counted in advance. That is, the beacon sending node may acquire operating channels of beacon sending nodes in the current wireless sensor network. In the embodiment of this invention, the beacon sending node can add operating channels of beacon sending nodes in the current wireless sensor network into the beacon frame and feed it back to the device node expecting for network. A beacon frame format of an embodiment of this invention is shown in Table 2.

TABLE 2

| 8-bit byte: 2 | 1          | 4/10    | 0/5/6/10/14 | 4               | 4       | variable | 2   |
|---------------|------------|---------|-------------|-----------------|---------|----------|-----|
| Frame         | Sequential | Address | Auxiliary   | Time            | Network | Beacon   | FCS |
| control       | No.        | field   | security    | synchronization | channel | payload  |     |
| field         |            |         | field       | field           | use list|          |     |
|               | Frame head |         |             | MAC payload     |         |          | MFR |

The channel link quality parameter may be RSSI (Received Signal Strength Indication). Since the channel link quality parameter contained in the beacon frame has time dependency, channel link quality parameters received at different times generally differ from each other even for the same channel. Thus, terms such as first channel link quality parameter and second channel link quality parameter are used in embodiments of this invention to distinguish channel link quality parameters at different times.

S103. Establish a new channel scan sequence according to beacon sending nodes of the current wireless sensor network.

Particularly, the operating channels of beacon sending nodes of the current wireless sensor network can be compared with the predefined channel scan sequence, and a new channel scan sequence is formed through deleting channels except those in the operating channels from the predefined channel scan sequence.

S104. Scan operating channels that have not been scanned in sequence according to the new channel scan sequence.

S105. Determine a parent node for accessing the wireless sensor network according to first channel link quality parameters in received beacon frames of the operating channels.

In the embodiment of this invention, a first channel link quality parameter is used to represent a channel link quality parameter carried in the first beacon frame during this channel scan process, and channel link quality parameters carried in received beacon frames during the scan process of operating channels that have not been scanned according to the new channel scan sequence. After receiving a beacon frame, the device node expecting for network may be aware of channel use information of the network according to information carried on the channel frame. The device node expecting for network may establish a new channel scan sequence according to operating channel information contained in the beacon frame. For example, in an embodiment, operating channels of beacon sending nodes of the current wireless sensor network can be compared with the predefined channel scan sequence, and then channels except those in the operating channels are deleted from the set channel scan sequence to establish a new channel scan sequence.

In subsequent channel scan, the device node expecting for network continue to scan channels that have not been scanned according to new channel scan sequence. Non-operating channels are excluded from the new channel scan sequence, and thus scanning according to the new channel scan sequence can save time otherwise wasted in the scan of non-operating channels. The newly constructed channel scan sequence is more optimal than the original predefined channel scan sequence, so that time required for subsequent channel scan is fundamentally reduced.

Continuing with the above example, in an embodiment of this invention, the predefined channel scan sequence is channel 1 to channel 13. The device node expecting for network begins channel scan from channel 1, assume that a first channel frame is received in the scan of channel 2, the channel scan process is then paused. From information carried on the beacon frame, it is determined that the current network comprises operating channels 2, 3, 4, 6, 9, 10, 13, 15 and 16. After comparing the operating channels in the current network with the predefined scan channels, channels except the operating channels are deleted, that is, the channels that originally would be scanned 5, 7, 8, 11 and 12 are deleted, to establish a new channel scan sequence, including 2, 3, 4, 6, 9, 10, 13. Because channels 1, 2 have been scanned, it is sufficient to continuously scan other operating channels that have not been scanned (channels 3, 4, 6, 9, 10 and 13) according to the new channel scan sequence.

When all operating channels in the new channel scan sequence have been scanned, through beacon frames returned on various operating channels, a parent node for accessing the wireless sensor network can be determined according to first channel link quality parameters carried on those beacon frames. For example, a beacon frame sending node with the best channel link quality parameter can be selected as the parent node for accessing the wireless sensor network.

S106. Select an operating channel for the device node expecting for network to access the wireless sensor network on the operating channel through the parent node.

After determining a parent node for wireless sensor network access, it is also necessary for the device node expecting for network to determine an operating channel, so that it can access the wireless sensor network on that operating channel through the parent node.

In an embodiment of this invention, any existing channel can be selected as the operating channel of the device node expecting for network; alternatively, an operating channel can be directly selected for the device node expecting for network according to the first channel link quality parameters.

In another embodiment of this invention, a second-round channel scan can be performed through synchronously switching channels with the parent node according to the new channel scan sequence. Particularly, the synchronous switch process comprises: performing channel scan on the same channel according to the new channel scan sequence by the device node expecting for network and the parent node simultaneously, then synchronously switching to a next channel to scan, until all channels in the new channel scan sequence have been scanned. The channel scan process may comprise: sending a beacon request frame on a channel by the device node expecting for network; returning a beacon frame to the device node expecting for network by the parent node after receiving the beacon request frame; receiving the beacon frame by the device node expecting for network, wherein a second channel link quality parameter is carried on the beacon frame.

An operating channel of the device node expecting for network is determined according to second channel link quality parameters carried on beacon frames received during the second-round channel scan. For example, a channel with the best second channel link quality parameter can be selected as the operating channel of the device node expecting for network.

The second channel link quality parameter is used to represent channel link quality parameters of operating channels carried on beacon frames received during the second-round channel scan.

Note that during the first-round channel scan, the first channel link quality parameters are carried on beacon frames received by the same device node expecting for network, which are sent on different operating channels by beacon sending nodes on those different operating channels, representing channel quality of those different operating channels; while the second channel link quality parameters are carried on beacon frames received by the same device node expecting for network sent during the second-round channel scan process, which are sent by the parent node on different operating channels, representing channel quality of different operating channels on which the parent node sends beacon frames. Thus, compared to the first channel link quality parameter, the second channel link quality parameter is more suitable to reflect differences between channels.

This invention does not have limitations on the method of operating channel determination, which can be selected as required in practice.

For example, if channel 6 is determined as having the best channel link quality according to first channel link quality parameters in beacon frames, a beacon sending node on channel 6 is selected as the parent node for the device node expecting for network to access the wireless sensor network, at the same time, channel 6 can be selected as the operating channel of the device node expecting for network to access the current wireless sensor network on channel 6 through the parent node.

According to the method provided in an embodiment of this invention, when a first beacon frame is received, channel scan is paused, and a new channel scan sequence is constructed according to operating channels of a current wireless sensor network recorded in the beacon frame, wherein non-operating channels are excluded from the new channel scan sequence, so that the time required for subsequence channel scan can be reduced, and the access to the current wireless sensor network by the device node expecting for network can be accelerated.

Figure 2:
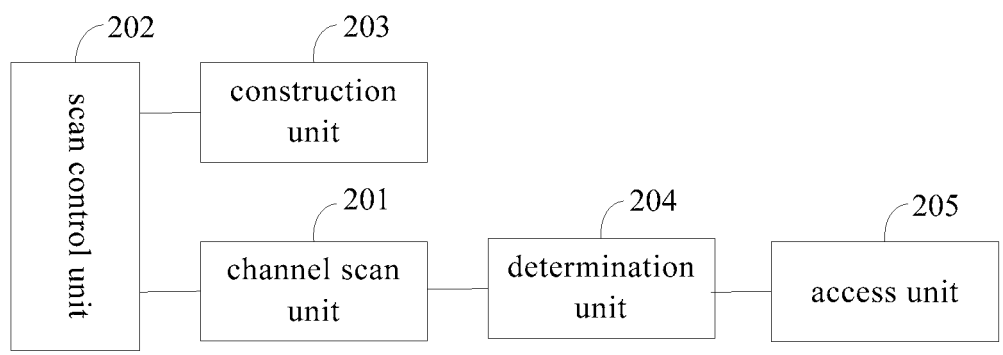
FIG. 2 is a schematic structure diagram of an apparatus provided in an embodiment of this invention.

Referring to FIG. 2, an apparatus for accessing a wireless sensor network is also provided in an embodiment of this invention, which is located in a device node expecting for network, comprising:

a channel scan unit 201, for performing channel scan from a first channel according to a predefined channel scan sequence;

a scan control unit 202, for pausing the channel scan when receiving a first beacon frame returned from a beacon sending node during the channel scan, the beacon frame carrying with operating channels of beacon sending nodes in a current wireless sensor network and a first channel link quality parameter;

a construction unit 203, for comparing the operating channels of beacon sending nodes in the current wireless sensor network with the predefined channel scan sequence to delete channels except the operating channels from the predefined channel scan sequence to construct a new channel scan sequence;

wherein, the scan control unit 202 is further used to continue the channel scan for the channels that have not been scanned according to the new channel scan sequence;

a determination unit 204, for determining a parent node for accessing the wireless sensor network according to first channel link quality parameters in received beacon frames of the operating channels;

an access unit 205, for selecting an operating channel for the device node expecting for network to access the wireless sensor network on the operating channel through the parent node.

Figure 3:
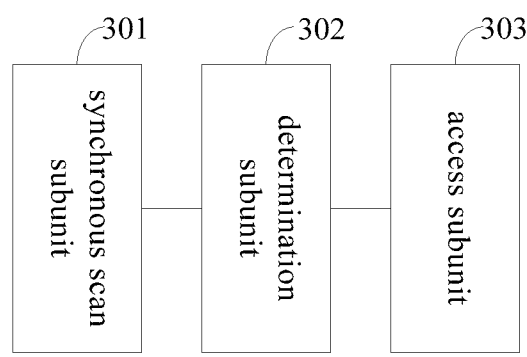
FIG. 3 is a schematic structure diagram of a unit of the apparatus provided in an embodiment of this invention.

In an embodiment of this invention, referring to FIG. 3, the access unit 205 comprises:

a synchronous scan subunit 301, for completing a second-round channel scan through synchronous channel switch with the parent node according to the new channel scan sequence;

a determination subunit 302, for determining an operating channel for the device node expecting for network according to second channel link quality parameters carried on beacon frames received during the second-round channel scan process;

an access subunit 303, for accessing the wireless sensor network on the operating channel through the parent node.

Figure 4:
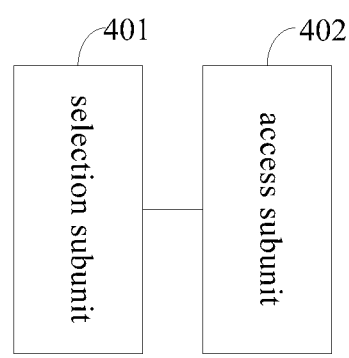
FIG. 4 is a schematic structure diagram of a unit of the apparatus provided in another embodiment of this invention.

Referring to FIG. 4, in another embodiment of this invention, the access unit 205 comprises:

a selection subunit 401, for selecting any existing channel as the operating channel of the device node expecting for network; or selecting the operating channel of the device node expecting for network according to the first channel link quality parameters in the beacon frames.

an access subunit 402, for accessing the wireless sensor network on the operating channel through the parent node.

According to the apparatus provided in an embodiment of this invention, when a first beacon frame is received, channel scan is paused, and a new channel scan sequence is constructed according to operating channels of a current wireless sensor network recorded in the beacon frame, wherein non-operating channels are excluded from the new channel scan sequence, so that the time required for subsequence channel scan can be reduced, and the access to the current wireless sensor network by the device node expecting for network can be accelerated.

Figure 5:
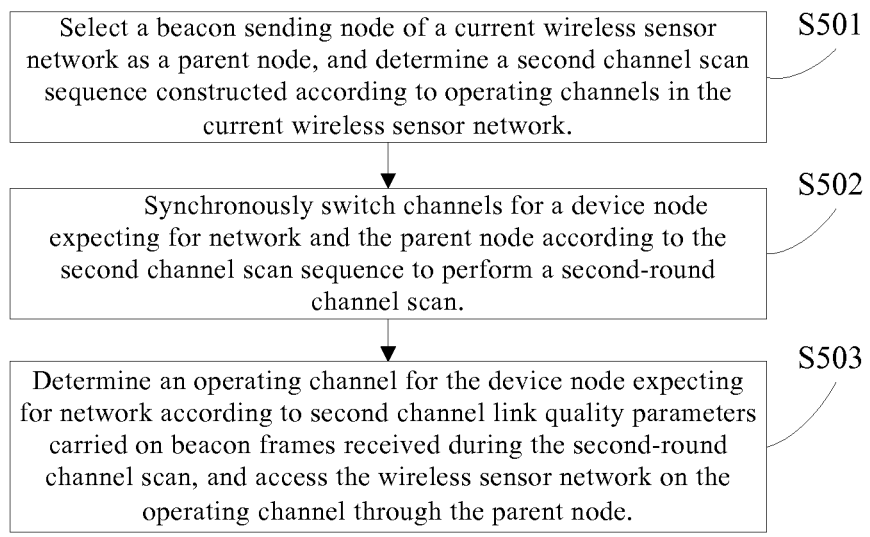
FIG. 5 is a flowchart of a method provided in another embodiment of this invention.

Referring to FIG. 5, another method for accessing a wireless sensor network is provided in an embodiment of this invention, comprising the following steps.

S501. Select a beacon sending node of a current wireless sensor network as a parent node, and determine a second channel scan sequence constructed according to operating channels in the current wireless sensor network.

S502. Synchronously switch channels for a device node expecting for network and the parent node according to the second channel scan sequence to perform a second-round channel scan.

After determining the parent node, the device node expecting for network and the parent node synchronously switch channels according the second channel scan sequence to complete the second-round channel scan for adjusted channels. In this embodiment, the purpose of the second-round channel scan is to determine an operating channel for the device node expecting for network, that is, to determine on which channel the device node expecting for network will operate.

Particularly, synchronously switching channels according the second channel scan sequence by the device node expecting for network and the parent node to complete the second-round channel scan for adjusted channels particularly comprises: according to the second channel scan sequence, switching to the same channel by the parent node and the device node expecting for network; after switching to the same channel by both of the parent node and the device node expecting for network, sending a beacon request frame by the device node expecting for network on a current channel to the parent node; returning a beacon frame by the parent node when receiving the beacon request frame; after receiving the beacon frame, switching to a next channel in the second channel scan sequence by the device node expecting for network along with the parent node to continue channel scan, until a beacon frame is received by the device node expecting for network on the last channel of the second channel scan sequence, after which the second-round channel scan process ends.

S503. Determine an operating channel for the device node expecting for network according to second channel link quality parameters carried on beacon frames received during the second-round channel scan, and access the wireless sensor network on the operating channel through the parent node.

In the embodiment of this invention, the second channel link quality parameters carried in the beacon frames may be RSSI. According to RSSI, an operating channel most suitable to its operation can be determined by the device node expecting for network. For example, a channel with the maximum RSSI can be selected as the operating channel. After determining the operating channel, the wireless sensor network can be accessed on the operating channel through the parent node.

In the method provided in the embodiment of this invention, a second channel scan sequence is constructed according to operating channels in a current wireless sensor network, a parent node is selected from beacon sending nodes, the parent node and a device node expecting for network synchronously switch channels according to the second channel scan sequence to complete a second-round channel scan process to acquire second channel link quality parameters of various channels, an operating channel of the device node expecting for network is selected according to the second channel link quality parameters, on which the wireless sensor network is accessed through the parent node. Because the second channel scan sequence is determined according to operating channels in the current wireless sensor network in which non-operating channels are excluded, time consumed on non-operating channels during the second-round channel scan process of the device node expecting for network can be avoided, so that time and energy consumed by the device node expecting for network to acquire channel status data can be fundamentally reduced, and the efficiency of device node expecting for network to access a wireless sensor network can be improved.

In an embodiment of this invention, step S501 can be realized through the following steps, particularly comprising:

performing channel scan from a first channel by a device node expecting for network according to a predefined channel scan sequence;

pausing the channel scan when receiving a first beacon frame returned from a beacon sending node, wherein the beacon frame carries with operating channels of beacon sending nodes in a current wireless sensor network and a first channel link quality parameter of a channel on which a current beacon sending node is located;

comparing the operating channels of beacon sending nodes in the current wireless sensor network with the predefined channel scan sequence to delete channels except the operating channels from the predefined channel scan sequence and construct a second channel scan sequence;

continuing the channel scan for operating channels that have not been scanned according to the second channel scan sequence;

determining a parent node for accessing the wireless sensor network according to first channel link quality parameters in received beacon frames of the operating channels.

In another embodiment of this invention, step S501 can be realized through the following manner, comprising:

performing a first-round channel scan from a first channel by a device node expecting for network according to a predefined channel scan sequence, until all channels in the channel scan sequence have been scanned;

constructing a second channel scan sequence according to beacon frames received on operating channels during the first-round channel scan, wherein the beacon frames carry with first channel link quality parameters of channels where these beacon frames come from;

selecting a beacon sending node as a parent node from the beacon sending nodes sending the beacon frames according to the channel link quality parameters.

When constructing the second channel scan sequence, operating channels corresponding to beacon frames received can be compared with the predefined channel scan sequence; channels except those in the operating channels are deleted from the predefined channel scan sequence to construct the second channel scan sequence; in other embodiments of this invention, channels having first channel link quality parameters exceeding a second predetermined threshold can be selected from operating channels corresponding to the received beacon frames to construct the second channel scan sequence.

The second predetermined threshold is an upper limit of the channel link quality parameters, if the channel link quality parameter of a channel reaches or even exceeds the second predetermined threshold, it is indicated that the channel has better channel link quality, and is suitable for the device node expecting for network as an operating channel.

After determining the second channel scan sequence, channels having first channel link quality parameters failed to meet a first predetermined threshold can be further deleted from the second channel scan sequence.

The first predetermined threshold is a lower limit of the channel link quality parameters, if the channel link quality parameter of a channel fails to meet the first predetermined threshold, it is indicated that the channel is unsuitable for the device node expecting for network as an operating channel.

In the method provided in the embodiment of this invention, after determining the parent node and the second channel scan sequence consisted of operating channels, the parent node and a device node expecting for network synchronously switch channels to complete a second-round channel scan process according to the second channel scan sequence to acquire second channel link quality parameters of various channels, an operating channel of the device node expecting for network is determined according to the second channel link quality parameters, on which the wireless sensor network is accessed through the parent node. Because the second channel scan sequence consists of operating channels, in which non-operating channels are excluded, it is not necessary to scan every channel in the predefined channel scan sequence, time and energy consumed by the device node expecting for network to acquire channel status data during the second-round channel scan can be reduced, and the efficiency of device node expecting for network to access a wireless sensor network can be improved.

Figure 6:
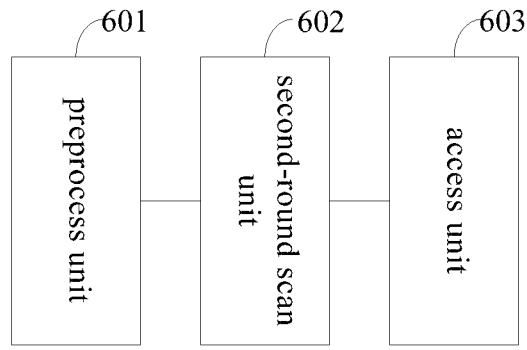
FIG. 6 is a schematic structure diagram of an apparatus provided in an embodiment of this invention.

Referring to FIG. 6, an apparatus for accessing a wireless sensor network is further provided in an embodiment of this invention, which is in a device node expecting for network, comprising:

a preprocess unit 601 for selecting a beacon sending node of a current wireless sensor network as a parent node, and determining a second channel scan sequence formed according to operating channels in the current wireless sensor network;

a second-round scan unit 602 for completing a second-round channel scan through making device node expecting for network and the parent node to synchronously switch channels according to the second channel scan sequence;

an access unit 603 for determining an operating channel for the device node expecting for network according to second channel link quality parameters carried on beacon frames received during the second-round channel scan, and accessing the wireless sensor network on the operating channel through the parent node.

Wherein, in an embodiment of this invention, the preprocess unit 601 comprises:

a first scan subunit for performing channel scan from a first channel by a device node expecting for network according to a predefined channel scan sequence;

a scan control subunit for pausing the channel scan when receiving a first beacon frame returned from a beacon sending node, wherein, the beacon frame carries with operating channels of beacon sending nodes in a current wireless sensor network and a first channel link quality parameter of a channel on which a current beacon sending node is located;

a first construction subunit for comparing the operating channels of beacon sending nodes in the current wireless sensor network with the predefined channel scan sequence to delete channels except the operating channels from the predefined channel scan sequence, and construct a second channel scan sequence;

wherein the scan control subunit is further used to continue the channel scan for channels that have not been scanned according to the second channel scan sequence;

a determination subunit for determining a parent node for accessing the wireless sensor network according to first channel link quality parameters in beacon frames received on the operating channels.

In another embodiment of this invention, the preprocess unit 601 comprises:

a second scan subunit for performing a first-round channel scan from a first channel by a device node expecting for network according to a predefined channel scan sequence, until every channel in the channel scan sequence has been scanned;

a second construction subunit for constructing a second channel scan sequence according to beacon frames received on operating channels during the first-round channel scan process, wherein the beacon frames carry with first channel link quality parameters of channels where those beacon frames come from;

a selection subunit for selecting beacon sending node as a parent node from beacon sending nodes sending the beacon frames according to the channel link quality parameters.

Wherein, the second construction subunit may further comprise:

a second comparison module for comparing operating channels corresponding to the received beacon frames with the predefined channel scan sequence;

a second deleting module for deleting channels except the operating channels corresponding to the received beacon frames from the predefined channel scan sequence to construct a second channel scan sequence.

In practical applications, the second construction subunit may further comprise:

a storage module for storing a second predetermined threshold;

a construction module for selecting channels having first channel link quality parameters exceeding the second predetermined threshold from operating channels of beacon sending nodes in the current wireless sensor network to construct the second channel scan sequence.

Optionally, the second deleting module is further used to delete channels having first channel link quality parameters failed to meet a first predetermined threshold from the second channel scan sequence.

The apparatus provided in the embodiment of this invention realizes network access for a device node expecting for network through two rounds of channel scan. A first-round channel scan process is performed according to a predefined channel scan sequence; non-operating channels are deleted from the predefined channel scan sequence according to beacon frames received during the first-round channel scan, to form a second channel scan sequence. Then a parent node is selected from beacon sending nodes capable of sending beacon frames; the parent node and the device node expecting for network synchronously switch channels according to the second channel scan sequence to complete a second-round channel scan process, to acquire second channel link quality parameters of various channels, and determine an operating channel for the device node expecting for network according to the second channel link quality parameters, on which the wireless sensor network is accessed through the parent node. Because the second channel scan sequence is determined through adjustment according to beacon frames received during the first-round channel scan, in which non-operating channels are deleted, it is not necessary to scan every channel in the predefined channel scan sequence, time and energy consumed by the device node expecting for network to acquire channel status data during the second-round channel scan can be reduced, and the efficiency of device node expecting for network to access a wireless sensor network can be improved.

This invention can be described in the context of computer executable instructions executed by a computer, for example, program modules. In general, those program modules comprise routines, programs, objects, components, data structures, etc for carrying out specific tasks or realizing specific abstract data structures. This invention also can be implemented in distributed environments, in which tasks are carried out by remote devices connected through communication networks. In distributed environments, program modules can be located on local and remote computer storage mediums, including storage devices.

What described above is merely preferred embodiments of this invention, it should be indicated that, for those skilled in the art, many improvements or modifications can be made without departing from the principle of this invention, which should be treated as being covered in the scope of this invention.

What is claimed is:

1. A method for accessing a wireless sensor network, comprising:

performing a channel scan from a first channel by a device node which is expecting to access the wireless sensor network according to a predefined channel scan sequence;

pausing the channel scan when receiving a first beacon frame returned from a beacon sending node during the channel scan, wherein the beacon frame contains operating channels in a current wireless sensor network;

comparing the operating channels in the current wireless sensor network with the predefined channel scan sequence to delete channels except the operating channels from the predefined channel scan sequence and construct a new channel scan sequence;

continuing the channel scan for all the operating channels that have not been scanned according to the new channel scan sequence, and receiving beacon frames during the scan for all the operating channels that have not been scanned;

selecting, after scanning all the operating channels in the new channel scan sequence, a parent node for accessing the wireless sensor network from nodes capable of sending beacon frames according to the first beacon frame and the beacon frames received during the scan for all the operating channels in the new channel scan sequence; and selecting an operating channel for said device node to access the wireless sensor network on the operating channel through the parent node, wherein selecting an operating channel for said device node to access the wireless sensor network on the operating channel through the parent node comprises:

constructing a second channel scan sequence according to beacon frames received on the operating channels during the first-round channel scan, wherein the beacon frames received on the operating channels during the channel scan carry first channel link quality parameters of operating channels where the beacon frames received on the operating channels during the first-round channel scan come from;

performing a second-round channel scan by synchronously switching channels with the parent node according to the second channel scan sequence;

wherein constructing the second channel scan sequence according to beacon frames received on operating channels during the first-round channel scan further comprises:

selecting operating channels having the first channel link quality parameter exceeding a threshold from the operating channels where the beacon frame received during the first-round channel scan come from to form the second channel scan sequence.

2. The method according to claim 1, wherein, selecting a parent node for accessing the wireless sensor network from the nodes capable of sending beacon frames according to the first beacon frame and the beacon frames received during the scan of operating channels in the new channel scan sequence comprises:

selecting the parent node for accessing the wireless sensor network from the nodes capable of sending beacon frames according to the first channel link quality parameter contained in the first beacon frame and channel link quality parameters of corresponding operating channels contained in the beacon frames received during the scan of operating channels in the new channel scan sequence.

3. The method according to claim 1, wherein selecting an operating channel for said device node comprises:

synchronously switching channels with the parent node according to the new channel scan sequence to complete a second-round channel scan;

determining an operating channel for said device node according to second channel link quality parameters carried on beacon frames received during the second-round channel scan.

4. The method according to claim 3, wherein the synchronous switch comprises:
performing the second-round channel scan on the same channel synchronously by said device node and the parent node according to the new channel scan sequence, and performing the second-round channel scan through synchronously switching to a next identical channel according to the new channel scan sequence until completing the second-round channel scan of channels in the new channel scan sequence.

5. The method according to claim 3, wherein determining an operating channel for said device node according to second channel link quality parameters carried on beacon frames received during the second-round channel scan comprises:
selecting a channel having best channel quality according to the second channel link quality parameter values as the operating channel for said device node.

6. An apparatus for accessing a wireless sensor network, comprising a processor configured to:
perform a channel scan from a first channel according to a predefined channel scan sequence;
pause the channel scan when receiving a first beacon frame returned from a beacon sending node during the channel scan, wherein the beacon frame contains operating channels in a current wireless sensor network;
compare the operating channels in the current wireless sensor network with the predefined channel scan sequence to delete channels except the operating channels from the predefined channel scan sequence and construct a new channel scan sequence;
continue the channel scan for all the operating channels that have not been scanned according to the new channel scan sequence, and receive beacon frames during the scan for all the operating channels that have not been scanned;
select, after scanning all the operating channels in the new channel scan sequence, a parent node for accessing the wireless sensor network from nodes capable of sending beacon frames according to the first beacon frame and the beacon frames received during the scan for all the operating channels in the new channel scan sequence; and
select an operating channel for said device node to access the wireless sensor network on the operating channel through the parent node,
wherein selecting an operating channel for said device node to access the wireless sensor network on the operating channel through the parent node comprises:
constructing a second channel scan sequence according to beacon frames received on the operating channels during the first-round channel scan, wherein the beacon frames received on the operating channels during the channel scan carry first channel link quality parameters of operating channels where the beacon frames received on the operating channels during the first-round channel scan come from;
performing a second-round channel scan by synchronously switching channels with the parent node according to the second channel scan sequence;
wherein constructing the second channel scan sequence according to beacon frames received on operating channels during the first-round channel scan further comprises:
selecting operating channels having the first channel link quality parameter exceeding a threshold from the operating channels where the beacon frame received during the first-round channel scan come from to form the second channel scan sequence.

7. The apparatus according to claim 6,
wherein the processor is further configured to select the parent node for accessing the wireless sensor network from the nodes capable of sending beacon frames according to the first channel link quality parameter contained in the first beacon frame and channel link quality parameters of corresponding operating channels contained in the beacon frames received during the scan of operating channels in the new channel scan sequence.

8. The apparatus according to claim 6, wherein the processor is further configured to:
synchronously switch channels with the parent node according to the new channel scan sequence to complete a second-round channel scan;
determine an operating channel for said device node according to second channel link quality parameters carried on beacon frames received during the second-round channel scan process; and
access the wireless sensor network on the operating channel through the parent node.

9. A method for accessing a wireless sensor network, comprising:
performing a first-round channel scan according to a predefined channel scan sequence, selecting a beacon sending node of a current wireless sensor network from nodes capable of sending beacon frames as a parent node, and determining a second channel scan sequence according to operating channels in the current wireless sensor network;
synchronously switching channels with the parent node according to the second channel scan sequence and performing a second-round channel scan;
determining an operating channel for a device node which is expecting to access the wireless sensor network according to second channel link quality parameters carried on beacon frames received during the second-round channel scan, and accessing the wireless sensor network on the operating channel through the parent node,
wherein said performing the first-round channel scan according to the predefined channel scan sequence, selecting the beacon sending node of the current wireless sensor network from the nodes capable of sending beacon frames as the parent node, and determining the second channel scan sequence according to operating channels in the current wireless sensor network comprises:
performing the first-round channel scan from a first channel by said device node according to the predefined channel scan sequence;
pausing the first-round channel scan when receiving a first beacon frame returned from a beacon sending node during the channel scan, wherein the beacon frame contains operating channels in a current wireless sensor network;
comparing the operating channels of beacon sending nodes in the current wireless sensor network with the predefined channel scan sequence, deleting channels except the operating channels of the beacon sending nodes from the predefined channel scan sequence, and constructing a new channel scan sequence;
continuing the first round channel scan for all the operating channels that have not been scanned according to the new channel scan sequence, and receiving beacon frames during the scan for all the operating channels that have not been scanned;

selecting, after scanning all the operating channels in the new channel scan sequence, a parent node for accessing the wireless sensor network from the nodes capable of sending beacon frames according to the first beacon frame and the beacon frames received during the scan for all the operating channels in the new channel scan sequence, wherein the beacon frames received on the operating channels during the first-round channel scan carry first channel link quality parameters of operating channels where the beacon frames received on the operating channels during the first-round channel scan come from;

wherein determining the second channel scan sequence according to operating channels in the current wireless sensor network comprises:

selecting operating channels having the first channel link quality parameter exceeding a threshold from the operating channels where the beacon frame received during the first-round channel scan come from to form the second channel scan sequence.

10. The method according to claim 9, wherein the beacon frames received during the scan of operating channels in the second channel scan sequence further comprises channel link quality parameters of corresponding operating channels;

wherein, selecting a parent node for accessing the wireless sensor network from the nodes capable of sending beacon frames according to the first beacon frame and the beacon frames received during the scan of operating channels in the second channel scan sequence comprises:

selecting the parent node for accessing the wireless sensor network from the nodes capable of sending beacon frames according to the first channel link quality parameter contained in the first beacon frame and channel link quality parameters of corresponding operating channels contained in the beacon frames received during the scan of operating channels that have not been scanned.

11. A method for accessing a wireless sensor network, comprising:

performing a first-round channel scan according to a predefined channel scan sequence, selecting a beacon sending node of a current wireless sensor network from nodes capable of sending beacon frames as a parent node, and determining a second channel scan sequence according to operating channels in the current wireless sensor network;

synchronously switching channels with the parent node according to the second channel scan sequence and performing a second-round channel scan;

determining an operating channel for a device node which is expecting to access the wireless sensor network according to second channel link quality parameters carried on beacon frames received during the second-round channel scan, and accessing the wireless sensor network on the operating channel through the parent node, wherein performing the first-round channel scan according to the predefined channel scan sequence, selecting the beacon sending node of the current wireless sensor network from the nodes capable of sending beacon frames as the parent node, and determining the second channel scan sequence according to operating channels in the current wireless sensor network comprises:

performing the first-round channel scan from a first channel by said device node according to the predefined channel scan sequence, until completing the first-round channel scan for all the channels in the predefined channel scan sequence;

constructing the second channel scan sequence according to beacon frames received on the operating channels during the first-round channel scan, wherein the beacon frames received on the operating channels during the first-round channel scan carry first channel link quality parameters of operating channels where the beacon frames received on the operating channels during the first-round channel scan come from;

selecting the beacon sending node as the parent node from the beacon sending nodes sending the beacon frames received on the operating channels during the first-round channel scan according to the first channel link quality parameters, wherein constructing the second channel scan sequence according to beacon frames received on operating channels during the first-round channel scan further comprises:

selecting operating channels having the first channel link quality parameter exceeding a threshold from the operating channels where the beacon frame received during the first-round channel scan come from to form the second channel scan sequence.

12. An apparatus for accessing a wireless sensor network, comprising a processor configured to:

perform a first-round channel scan according to a predefined channel scan sequence, selecting a beacon sending node of a current wireless sensor network from nodes capable of sending beacon frames as a parent node, and determine a second channel scan sequence according to operating channels in the current wireless sensor network;

synchronously switch channels with the parent node according to the second channel scan sequence to perform a second-round channel scan;

determine an operating channel for a device node which is expecting to access the wireless sensor network according to second channel link quality parameters carried on beacon frames received during the second-round channel scan, and accessing the wireless sensor network on the operating channel through the parent node;

in the first-round channel scan, pause the first-round channel scan when receiving a first beacon frame returned from a beacon sending node during the channel scan, wherein, the beacon frame contains operating channels in the current wireless sensor network;

compare the operating channels of beacon sending nodes in the current wireless sensor network with the predefined channel scan sequence to delete channels except the operating channels of the beacon sending nodes from the predefined channel scan sequence and construct a new channel scan sequence;

continue the channel scan for all the operating channels that have not been scanned according to the new channel scan sequence, and receive beacon frames during the scan for all the operating channels that have not been scanned; and select, after scanning all the operating channels in the new channel scan sequence, a parent node for accessing the wireless sensor network from the nodes capable of sending beacon frames according to the first beacon frame and the beacon frames received during the scan for all the operating channels in the new channel scan sequence, wherein the beacon frames received on the operating channels during the first-round channel scan carry first channel link quality parameters of operating channels where the beacon frames received on the operating channels during the first-round channel scan come from;

wherein determining the second channel scan sequence according to operating channels in the current wireless sensor network comprises:

selecting operating channels having the first channel link quality parameter exceeding a threshold from the operating channels where the beacon frame received during the first-round channel scan come from to form the second channel scan sequence.

13. The apparatus according to claim 12, wherein,
the processor is further configured to select the parent node for accessing the wireless sensor network from the nodes capable of sending beacon frames according to the first channel link quality parameter contained in the first beacon frame and channel link quality parameters of corresponding operating channels contained in the received beacon frames during the scan of operating channels in the second channel scan sequence.

14. An apparatus for accessing a wireless sensor network, comprising a processor configured to:

perform a first-round channel scan according to a predefined channel scan sequence, select a beacon sending node of a current wireless sensor network from nodes capable of sending beacon frames as a parent node, and determine a second channel scan sequence according to operating channels in the current wireless sensor network;

synchronously switch channels with the parent node according to the second channel scan sequence to perform a second-round channel scan;

determine an operating channel for a device node which is expecting to access the wireless sensor network according to second channel link quality parameters carried on beacon frames received during the second-round channel scan, and accessing the wireless sensor network on the operating channel through the parent node, wherein the processor being configured to perform the first-round channel scan according to the predefined channel scan sequence, select the beacon sending node of the current wireless sensor network from the nodes capable of sending beacon frames as the parent node, and determine the second channel scan sequence according to the operating channels in the current wireless sensor network comprises the processor being configured to:

perform the first-round channel scan from a first channel according to the predefined channel scan sequence, until every channel in the predefined channel scan sequence has been scanned;

construct the second channel scan sequence according to beacon frames received on the operating channels during the first-round channel scan, wherein the beacon frames received on the operating channels during the first-round channel scan carry first channel link quality parameters of channels where the beacon frames received on the operating channels during the first-round channel scan come from; and select the beacon sending node as the parent node from beacon sending nodes sending the beacon frames received on the operating channels during the first-round channel scan according to the first channel link quality parameters, wherein the processor being configured to construct the second channel scan sequence according to beacon frames received on the operating channels during the first-round channel scan comprises the processor being configured to:

store a predetermined threshold; and select channels having first channel link quality parameters exceeding the predetermined threshold from operating channels of beacon sending nodes in the current wireless sensor network to construct the second channel scan sequence.

* * * * *